United States Patent [19]
Siskin et al.

[11] 3,888,937
[45] June 10, 1975

[54] CATALYTIC HYDROGENATION WITH A MIXTURE OF METAL HALIDE AND ANHYDROUS PROTONIC ACID

[75] Inventors: Michael Siskin, Maplewood; Jos P. Wristers, New Brunswick, both of N.J.

[73] Assignee: Exxon Research and Engineering Company, Linden, N.J.

[22] Filed: June 12, 1973

[21] Appl. No.: 369,304

[52] U.S. Cl. .............. 260/667; 208/143; 260/683.9
[51] Int. Cl. ............................................. C07c 5/10
[58] Field of Search .......... 260/667, 683.9; 208/143

[56] References Cited
UNITED STATES PATENTS
3,409,684 11/1968 Aristoff et al. ...................... 260/667
3,655,792 4/1972 Mitchell et al. ...................... 260/667

*Primary Examiner*—C. Davis
*Attorney, Agent, or Firm*—R. J. Ott; J. W. Ditsler

[57] ABSTRACT

Unsaturated hydrocarbons are catalytically hydrogenated in the presence of an aliphatic solvent and a mixture of a metal halide, such as tantalum pentafluoride, and an anhydrous protonic acid such as hydrogen fluoride.

13 Claims, No Drawings

CATALYTIC HYDROGENATION WITH A MIXTURE OF METAL HALIDE AND ANHYDROUS PROTONIC ACID

BACKGROUND OF THE INVENTION

1. Field of the Invention

This invention relates to the hydrogenation of organic compounds. It is more particularly concerned with a process wherein an unsaturated hydrocarbon is hydrogenated in the presence of an aliphatic solvent and a mixture of metal halide and anhydrous acid to produce higher molecular weight products.

2. Description of the Prior Art

The use of catalysts to effect hydrogenation of unsaturated organic compounds is well known. For the most part, hydrogenation catalysts are solids consisting of metals and metal oxides. Exemplary of such catalysts are nickel, platinum, platinum oxide, copper, copper chromite, cobalt, palladium and palladium oxide.

SUMMARY OF THE INVENTION

In accordance with the present invention, it has been found that unsaturated organic compounds can be hydrogenated at relatively low temperatures and pressures with a catalyst composition comprising a metal halide in combination with at least a molar equivalent of a protonic acid.

The metal halide used in combination with the protonic acid comprises the fluorides, bromides and chlorides (including those halides containing combinations of fluorine, bromine and chlorine) of the following metals: aluminum, gallium, tin, lead, vanadium, niobium, tantalum, arsenic, chromium, molybdenum, tungsten and the rare earth and transuranium metals, such as uranium and neodymium. The preferred metal halide catalyst constituents are tantalum and niobium halides, preferably tantalum pentafluoride, niobium pentafluoride and mixtures thereof.

The protonic acid catalyst component of the invention includes those acids or anhydrides (or mixtures thereof) capable of being a proton donor to the system and furthere being characterized by the formula HX, $R_aX_bQO_c$ or mixtures thereof where H is hydrogen; X is chlorine, bromine, fluorine and/or iodine; R is hydrogen, $C_1$–$C_4$ alkyl, $C_3$–$C_{10}$ cycloalkyl and/or $C_6$–$C_{10}$ aryl; Q is either phosphorus or sulfur; O is oxygen; $a$ is an integer ranging from 1 to 4 and $b$ and $c$ are integers ranging from 0 to 6. Preferably, the protonic acid is an anhydrous hydrogen halide. Useful materials include hydrogen bromide, hydrogen chloride and hydrogen fluoride, fluorosulfonic acid, mono-fluorophosphoric acid, difluorophosphoric acid, trifluoromethanesulfonic acid, trifluoroacetic acid, bis (perfluoromethylsulfonyl) methane and the like. It is desirable in order to avoid undesirable exchange reactions, that the halide moiety of the hydrogen halide or acid be one that will not cause undesirable exchange reactions with the metal halide constituent of the catalyst system. For example, if tantalum pentabromide is used as the metal constituent, the preferred hydrogen halide co-catalyst would be hydrogen bromide since the halogen moieties of both hydrogen chloride and hydrogen fluoride would exchange with the bromine atoms of the tantalum bromide metal constituent. Desirably, the halide moiety of the hydrogen halide and the metal halide are the same. The preferred hydrogen halide catalyst constituent is hydrogen fluoride.

The relative amounts of metal halide and protonic acid, such as hydrogen halide, may vary widely. In general, at least an equal molar amount of hydrogen halide relative to metal halide should be present in the reaction zone. The protonic acid/metal halide molar ratio is preferably at least 2:1, more preferably at least about 5:1. The upper limit on the protonic acid/metal halide molar ratio is not critical since the protonic acid may also function as a diluent or solvent for the reaction. The maximum amount thereof will be governed by cost and capacity considerations. Depending upon the relative amounts of catalyst constituents used, the catalyst, when no support is employed, may be a homogeneous solution of protonic acid and metal halide or a mixture of solid and dissolved metal halide in protonic acid.

The hydrogenation reaction is preferably carried out in the presence of an aliphatic solvent or diluent material. While not known for a certainty, the presence of the aliphatic solvent facilitates the hydrogenation reaction by acting as a hydride donor. Useful solvents include the $C_4$–$C_{16}$ aliphatic compounds, preferably the $C_4$–$C_6$ paraffins. Specific examples of such compounds include, among others, isobutane, n-pentane, isopentane, n-hexane and the isomeric hexanes. The amount of such aliphatic solvent may vary widely. In general, the rate of hydrogenation is increased by increasing the amount of aliphatic solvent within the reaction zone. Accordingly, the amount of aliphatic solvent to be used will be governed by economic considerations. In most instances, the volume ratio of feed to aliphatic solvent will be within the range of 5:1 to 1:10.

The feed which is hydrogenated in accordance with the invention comprises an unsaturated organic compound which is capable of hydrogen addition. The catalyst system of this invention is particularly useful for hydrogenating organic compounds containing one or more ethylenic linkages. Thus, it has been found that the catalyst defined herein will readily facilitate the hydrogenation of an ethylenic to a paraffinic linkage. The catalyst of the invention is particularly useful for hydrogenation of aromatic compounds. The feed for hydrogenation will therefore preferably comprise olefins and aromatics such as butenes, pentenes, hexenes, benzene, naphthalene, anthracene, phenanthrene, toluene, xylene, chrysene, pyrene, tetralin, biphenyl, and the like.

Hydrogenation in accordance with the present invention is carried out at a temperature in the range of 0° to 400°C., preferably in the range of 25° to 200°C. Most preferably, the reaction is conducted at a temperature between 25° to 125°C. The hydrogenation reaction is preferably conducted at a pressure sufficient to maintain the unsaturated feed and catalyst in substantially the liquid phase. In general, the hydrogen partial pressures in the reaction zone will be sufficient to saturate the ethylenic linkages and will usually vary from about 25 to 3,000, preferably from about 25 to 1,000 psig. The amount of hydrogen employed will depend upon the degree of saturation desired. Typically, from 0.1 to 5.0 moles, more usually from 0.1 to 2.0 moles, of hydrogen are employed per ethylenic linkage. The reaction time will depend upon the temperature used, the nature of the feed and the products desired and, thus, may vary widely. In most cases, the reaction time will be within the range of 0.5 minute to 50 hours, preferably within the range of 1 to 250 minutes.

Hydrogen employed in the hydrogenation of the feed may be derived from any suitable source. Typically, in a refinery operation, the hydrogen employed may be a crude or an impure hydrogen stream such as that obtained from a naphtha reforming operation. Alternatively, hydrogen may be generated in situ by introducing hydrogen donors into the reaction zone during the course of the reaction. Examples of useful hydrogen donors include materials such as decalin, methylcyclohexane, methylcyclopentane, and the like. Most preferably, elemental hydrogen is introduced into the reaction zone.

In general, feed hydrogen and optional solvent are admixed with the catalyst in a substantially liquid phase operation. The contacting may be carried out in a plurality of serially connected mixing zones. In this type of operation, the catalyst phase and hydrocarbon phase are separated following reaction and the product recovered from unreacted feedstock utilizing conventional distillation techniques. Optionally, the metal halide catalyst component may be impregnated upon an inert (to hydrogen halide) porous support material such as a fluorinated refractory oxide, fluorinated Vycor glass, graphite, charcoal, polytetrafluoroethylene (Teflon) based supports as Chromasorb T and Fluoropak 80, and the feedstock and hydrogen halide co-catalyst passed over the supported metal halide in either a liquid phase, gaseous phase or mixed phase operation. Alternatively, both the hydrogen halide and metal halide catalyst materials can be impregnated upon an HF-resistant support material and the feedstock passed over the catalyst.

The amount of metal halide catalyst component present in the reaction zone is not always critical. Typically, from about 0.1 to 20, preferably 0.5 to 10 volume parts of metal halide are present in the reaction zone per volume part of feed to be hydrogenated. When sulfur or polynuclear aromatics are present in the feed, it is desirable, if maximum catalyst activity is desired, to have a molar excess of metal halide present in the reaction zone relative to the amount of sulfur or polynuclear aromatic compounds present in the reaction zone at any point in time. In an operation wherein a support catalyst is used, the reaction liquid hourly space velocity (the liquid volume of feed per hour per volume of catalyst) would be maintained at levels of less than about 200, usually between about 0.1 and 20.

If maximum catalyst activity is desired, the feed, diluents, and individual catalyst constituents should be purified prior to use to remove water, and/or nitrogen-containing compounds, such as amines or ammonia. Nitrogen-containing compounds form more stable compounds or complexes with the catalyst constituents. The presence of small amounts of water or nitrogen-containing materials are tolerable if the corresponding catalyst loss or drop in catalyst activity can be accepted. Preferably, the water or nitrogen compound concentration within the reaction zone should not exceed about 0.01 wt. %, preferably about 1 wppm, based on total catalyst. More preferably, the reaction is conducted in the substantial absence of water and/or nitrogen-containing compounds.

DESCRIPTION OF THE PREFERRED EMBODIMENTS

The following examples further illustrate the present invention. Unless otherwise specified, all percentages and parts are by weight.

EXAMPLE 1

Into a 300 milliliter Hasteloy-C autoclave were placed 64 grams of isopentane, 12.8 grams of naphthalene, 55.2 grams of tantalum pentafluoride, and 45.0 grams of hydrogen fluoride. Hydrogen was then added until the pressure in the autoclave was 500 psig (pounds per square inch gauge). The contents of the autoclave were stirred and heated to 50°C. As hydrogen was used up more was added so as to keep the total pressure inside the autoclave at about 500 psig.

After 1 hour reaction, the entire contents of the autoclave were vented into an ice/water (200 ml.) mixture. The mixture was then extracted with ether. The ether extract was dried, filtered and heated at 25°C. for one-half hour under reduced pressure to distill off the solvent.

Analyses by vapor phase chromatography and by nuclear magnetic resonance indicated that about 75% of the product consisted of tetralin with no naphthalene present thereby demonstrating the ability of the catalyst system of this invention to promote the hydrogenation of polynuclear aromatics.

EXAMPLE 2

Into a 300 milliliter Hasteloy-C autoclave were placed 36 ml. of benzene, 20 ml. of n-pentane, 90 ml. of isopentane, 55.2 grams of tantalum pentafluoride, and 42.5 grams of hydrogen fluoride. Hydrogen was then added until the pressure inside the autoclave was 700 psig. The autoclave was heated to 50°C. at which time the total pressure in the autoclave was 730 psig. Additional hydrogen was added until the total pressure in the autoclave was 800 psig. The contents of the autoclave were stirred and hydrogen was added in order to maintain 800 psig. inside the autoclave. Hydrogen consumption matched the hydrogenation of benzene to cyclohexane and isomeric hexanes.

Samples were taken from the hydrocarbon layer at specific times and analyzed by vapor phase chromatography.

ANALYSIS OF SAMPLES, WT. %

| Product Distribution | O Hour | 1 Hour | 3 Hours | 6 Hrs. |
|---|---|---|---|---|
| Sum of $C_5$'s | 74.75 | 72.16 | 69.94 | 66.62 |
| 2,2—$DMC_4$ | — | 0.34 | 2.16 | 6.09 |
| 2,3—$DMC_4$ + 2—$MC_5$ | — | 0.78 | 2.49 | 5.78 |
| 3—$MC_5$ | — | 0.27 | 0.86 | 1.98 |
| n—$C_6$ | — | 0.12 | 0.44 | 1.02 |
| MCyP | 0.10 | 1.24 | 1.85 | 1.69 |
| $C_6H_6$ | 24.89 | 18.66 | 11.45 | 4.83 |
| $CyC_6$ | — | 5.28 | 8.48 | 8.04 |

$C_x$ = compound having x carbon atoms, D = di, M = methyl, Cy = cyclo, P = pentane.

The hydrogenation activity of the subject catalyst system is shown by the above results. When the hydrogenation is carried out without the presence of the paraffinic solvent, it is found that very little hydrogenation of the benzene feed is achieved.

What is claimed is:

1. A process for hydrogenating a feed comprising organic compounds containing one or more ethylenic linkages which comprises:
    1. contacting said feed in the presence of hydrogen with a catalyst comprised of a. a metal halide wherein said metal is aluminum, gallium, tin, lead, vanadium, niobium, tantalum, arsenic, chromium, molybdenum, tungsten, rare earth and/or transuranium metal and said halide is fluoride, chloride, bromide and/or iodide, and b. at least an equal molar amount, based on metal halide, of a protonic acid capable of being a proton donor to the system and further being characterized by the formula HX, $R_aX_bQO_c$ or mixtures thereof where H is hydrogen, X is chlorine, bromine, fluorine and/or iodine; R is hydrogen, $C_1$–$C_4$ alkyl, $C_3$–$C_{10}$ cycloalkyl and/or $C_6$–$C_{10}$ aryl, Q is either phosphorus or sulfur; O is oxygen; $a$ is an integer ranging from 1 to 4 and $b$ and $c$ are integers ranging from 0 to 6; and 2. recovering a product having an average molecular weight higher than the average molecular weight of the feed.

2. The process of claim 1 wherein said feed is contacted in the presence of an aliphatic diluent.

3. The process of claim 2 wherein said protonic acid is anhydrous hydrogen fluoride, hydrogen bromide, hydrogen chloride or mixtures thereof.

4. The process of claim 3 wherein said aliphatic diluent is a paraffin containing 4 to 6 carbon atoms.

5. The process of claim 4 wherein the molar ratio of hydrogen halide to metal halide present is at least 5:1.

6. The process of claim 5 wherein the temperature is within the range between about 25° to 125°C.

7. The process of claim 6 wherein said metal halide is a metal fluoride and said hydrogen halide is hydrogen fluoride.

8. The process of claim 7 wherein said metal fluoride is tantalum pentafluoride, niobium pentafluoride or mixtures thereof.

9. The process of claim 2 wherein said catalyst is comprised of (1) tantalum pentafluoride, and (2) anhydrous hydrogen fluoride.

10. The process of claim 9 wherein the molar ratio of hydrogen fluoride to tantalum pentafluoride present is at least 5:1 and said aliphatic diluent is a $C_4$–$C_6$ paraffin.

11. The process of claim 2 wherein said catalyst is comprised of (1) niobium pentafluoride, and (2) anhydrous hydrogen fluoride.

12. The process of claim 11 wherein the molar ratio of hydrogen fluoride to niobium pentafluoride is at least 5:1 and said aliphatic diluent is a $C_4$–$C_6$ paraffin.

13. The process of claim 1 wherein the feed is selected from the group consisting of olefins and aromatics or mixtures thereof.

* * * * *